US009911169B1

(12) United States Patent
Geist et al.

(10) Patent No.: US 9,911,169 B1
(45) Date of Patent: Mar. 6, 2018

(54) METHOD AND APPARATUS FOR SHARING TOLL CHARGES AMONG SEVERAL TOLL SERVICE SUBSCRIBERS

(71) Applicants: Wyatt Drake Geist, Davie, FL (US); Jaime Andres Borras, Pembroke Pines, FL (US); Timothy J. McGuckin, Reston, VA (US)

(72) Inventors: Wyatt Drake Geist, Davie, FL (US); Jaime Andres Borras, Pembroke Pines, FL (US); Timothy J. McGuckin, Reston, VA (US)

(73) Assignee: GeoToll, Inc., Cooper City, FL (US)

( * ) Notice: Subject to any disclaimer, the term of this patent is extended or adjusted under 35 U.S.C. 154(b) by 1039 days.

(21) Appl. No.: 14/032,956

(22) Filed: Sep. 20, 2013

(51) Int. Cl.
*G07B 15/00* (2011.01)
*G06Q 50/30* (2012.01)
*G06Q 10/00* (2012.01)

(52) U.S. Cl.
CPC ............. *G06Q 50/30* (2013.01); *G06Q 10/00* (2013.01)

(58) Field of Classification Search
CPC ... G07B 15/063; G06Q 50/30; G06Q 30/0207
USPC ............................................. 705/13; 340/928
See application file for complete search history.

(56) References Cited

U.S. PATENT DOCUMENTS

| | | | | |
|---|---|---|---|---|
| 4,336,522 A * | 6/1982 | Graham | ................. | G07B 13/02 235/30 R |
| 5,920,057 A * | 7/1999 | Sonderegger | .......... | G07B 13/00 235/375 |
| 7,375,648 B1 * | 5/2008 | Mulka | ................... | G08G 1/017 340/539.1 |
| 7,742,941 B2 * | 6/2010 | Yamauchi | .............. | G06Q 20/26 705/13 |
| 2002/0080014 A1 * | 6/2002 | McCarthy | .............. | B60N 2/002 340/426.1 |
| 2005/0179563 A1 * | 8/2005 | Kelley | ...................... | G08G 1/01 340/928 |
| 2006/0015394 A1 * | 1/2006 | Sorensen | ............. | G07B 15/063 705/13 |
| 2006/0155460 A1 * | 7/2006 | Raney | ................... | G01C 21/20 701/468 |
| 2007/0278300 A1 * | 12/2007 | Dawson | ................. | G07B 15/06 235/384 |
| 2008/0277183 A1 * | 11/2008 | Huang | ................... | B60R 25/00 180/271 |

(Continued)

FOREIGN PATENT DOCUMENTS

| | | | | | |
|---|---|---|---|---|---|
| DE | 102012215734 | * | 9/2012 | ............. | G07B 15/02 |
| WO | WO2013/004864 | * | 7/2012 | ............... | G06K 9/00 |

OTHER PUBLICATIONS

Metro Expresslanes Program http://www.metro.net/projects/expresslanes/faq/.

*Primary Examiner* — Brian Epstein
(74) *Attorney, Agent, or Firm* — The Concept Law Group, P.A.; Scott M. Garrett (57) ABSTRACT

A method for apportioning a vehicular toll among toll service subscribers in a vehicle can include determining a number of occupants in the vehicle in order to determine a toll amount, and dividing the toll amount among the toll service subscribers in the vehicle. The method can also detect the number of occupants and/or toll service subscribers in the vehicle automatically, or by prompting toll service subscribers to enter the number of occupants.

8 Claims, 7 Drawing Sheets

(56) References Cited

U.S. PATENT DOCUMENTS

| | | | |
|---|---|---|---|
| 2009/0093932 A1* | 4/2009 | McCall | B60R 22/48 701/45 |
| 2010/0026465 A1* | 2/2010 | Gravelle | H04Q 9/00 340/10.1 |
| 2010/0085213 A1* | 4/2010 | Turnock | G08G 1/017 340/928 |
| 2010/0106567 A1* | 4/2010 | McNew | G06Q 10/06 705/13 |
| 2010/0161392 A1* | 6/2010 | Ashby | G06Q 30/02 705/13 |
| 2010/0201505 A1* | 8/2010 | Honary | G08G 1/207 340/425.5 |
| 2010/0295563 A1* | 11/2010 | Bieck | B60N 2/002 324/679 |
| 2011/0090095 A1* | 4/2011 | Goldmann | G07B 15/063 340/928 |
| 2011/0102156 A1* | 5/2011 | Gravelle | G06K 19/0716 340/10.6 |
| 2011/0137773 A1* | 6/2011 | Davis, III | G01G 19/4142 705/34 |
| 2011/0202393 A1* | 8/2011 | DeWakar | G06Q 20/102 705/13 |
| 2011/0208568 A1* | 8/2011 | Deitiker | G07B 15/063 705/13 |
| 2012/0143786 A1* | 6/2012 | Karner | G06Q 30/0283 705/400 |
| 2013/0054281 A1* | 2/2013 | Thakkar | G06Q 50/30 705/5 |
| 2014/0180773 A1* | 6/2014 | Zafiroglu | G06Q 30/0207 705/13 |
| 2014/0278841 A1* | 9/2014 | Natinsky | G07B 15/063 705/13 |
| 2015/0021389 A1* | 1/2015 | Gravelle | G06Q 20/10 235/375 |

* cited by examiner

METHOD AND APPARATUS FOR SHARING TOLL CHARGES AMONG SEVERAL TOLL SERVICE SUBSCRIBERS

FIELD OF THE DISCLOSURE

The present disclosure relates generally to vehicular toll systems, and more particularly to dividing toll charges among several entities using the same vehicle.

BACKGROUND

Tolls have long been used to fund the construction and maintenance of roads. Such roads are often referred to as tollways. Traditionally all vehicles travelling on a road where tolls are charged had to stop at toll stations in toll plazas located along the tollway at intervals and pay a toll. Toll stations were either automated or manned, and required payment in cash. Accordingly, payment of tolls required vehicles to stop and pay, causing congestion and delay at each toll plaza.

In recent years toll agencies have been increasingly using wireless technology to automate toll payment and speed up the process to alleviate congestion at toll plazas. Wireless toll payment has developed to the point that vehicles can drive under a toll gantry at normal speed, without having to slow down. As vehicles drive toward a toll gantry the vehicle is detected by the toll system and a reader for the lane in which the vehicle is travelling is activated, transmitting a reader signal. A toll tag device in the vehicle receives and responds to the reader signal, transmitting a tag identifier that is associated with a toll account to which payment is charged. The owner of the toll tag device is responsible for ensuring there are sufficient funds available in the account. When a vehicle passes a toll gantry and fails to respond to the reader signal, a photo of the vehicle, taken as it passes the toll gantry, can be processed to acquire a license number of the vehicle, and an infraction or citation can be issued to the registered owner of the vehicle for payment.

The success of wireless, automated toll payment systems has also recently been used to generate revenue along roadways that are subject to periodic congestion merely due to the volume of traffic at certain times by providing toll lanes alongside non-toll lanes of the roadway. Typically the toll lanes have very restricted access and limited exits, in part to prevent people from driving around toll gantries. Thus, the toll lanes allow drivers a choice to bypass much of the congestion in the non-toll lanes in exchange for payment of the toll. Some toll agencies adjust the toll amount based on the time of day or the amount of congestion in the non-toll lanes, increasing the toll at times when there is high congestion and reducing the toll when there is little to no congestion in the non-toll lanes.

Toll lane expressways alongside non-toll lanes are, in part, a response to the problems of high occupancy vehicle (HOV) lanes. In many jurisdictions, in an attempt to reduce congestion, HOV lanes have been established for vehicles carrying more than one occupant. These lanes typically do not have restricted access, and while most people observe the HOV, solo drivers often take advantage of the relatively empty HOV lane rather than staying in the regular lanes, which tends to defeat the purpose of the HOV, thus necessitating enforcement of HOV lanes. However, enforcement of HOV lanes typically requires officers patrolling the HOV, often stopping offenders during peak traffic hours. The presence of law enforcement can aggravate congestion as offenders attempt to quickly change lanes and other drivers slow down upon seeing law enforcement vehicles patrolling HOV lanes, which further tends to defeat the purpose of HOV lanes.

Ideally, jurisdictions would like to encourage people to carpool or ride share, as well as offer toll lanes for drivers willing to pay to avoid congested lanes in a way that requires minimal enforcement activity.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

The embodiments include a method of apportioning toll payment that involves determining, at a toll service system, an identity of each of a plurality of toll service subscribers located together in a vehicle. Each toll service subscriber has a toll account with the toll service system that is associated with each toll service subscriber, respectively. The method further includes receiving, at a toll service system from one of the toll service subscribers, an indication of a toll transaction occurrence. Responsive to receiving the indication of the toll transaction occurrence, the toll service system debits the account of each toll service subscriber in the vehicle for a portion of a toll amount for the toll transaction.

Figure 1:
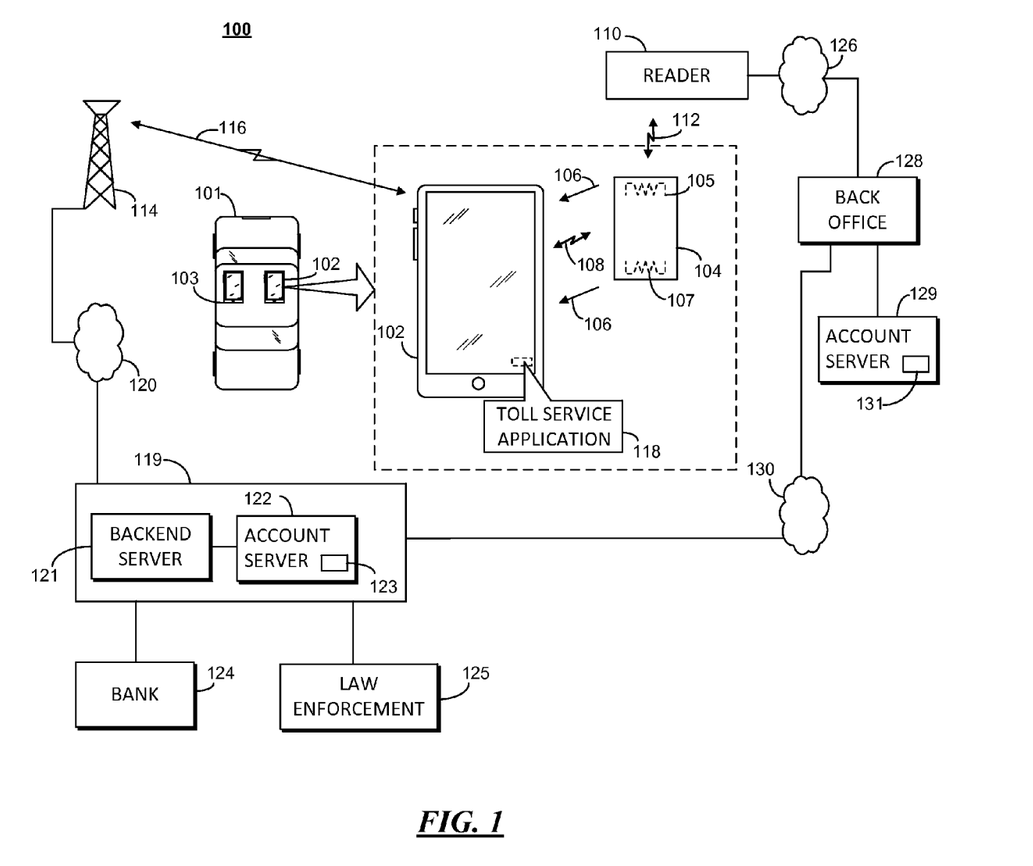
FIG. 1 is a system diagram of a toll service system that supports toll sharing in accordance with some embodiments.

FIG. 1 is a system 100 for operating a toll service and a toll agency in accordance with some embodiments. A toll agency refers to, typically, a governmental organization that has established one or more toll roads or toll lanes that can include toll plazas or toll stations, and collects tolls from vehicles, vehicle owners, or others operating vehicles for use of the toll roads. A toll service refers to an organization that manages toll accounts for drivers and vehicle operators and owners, and interfaces with the toll agency or agencies to ensure payment of tolls collected through automatic wireless toll stations. People can subscribe to the toll service and set up an account from which funds can be withdrawn or debited to pay for tolls incurred by the account holder using a vehicle or vehicles associated with the account.

Accordingly, a vehicle 101 can contain one or more toll service subscribers or subscriber devices 102, 103. As used herein, the term toll service subscriber refers alternately either to a small, portable computing device that includes one or more radio transceivers or the person who uses such a device and subscribes to a toll service, depending on the context. Examples of toll service subscribers include, for example, cellular or "smart" phones, tablet computing devices, personal digital assistants, and so on. In addition to radio interface(s), a toll service subscriber 102 includes a graphical display and input means to allow a user of the toll service subscriber 102 to interact with, and control operation of the toll service subscriber 102, as well as memory and a processor to execute program code for applications, programs, operating systems, and other software elements, such as, for example, a toll service application 118. The memory includes read only memory (ROM) and random access memory (RAM), and can include other types of memory such as flash memory, and can include memory expansion such as memory card slots. In some embodiments the toll service subscriber 102 can be associated with an RFID tag device 104 to enable wireless toll transactions for payment of toll when the vehicle 101 is travelling on tollways using wireless toll payment systems.

The RFID tag device 104 contains identity information that can be used for conducting wireless transactions. Accordingly, the RFID tag device 104 includes at least two radio frequency (RF) interfaces. A RF interface is a wireless radio interface and includes an antenna and transceiver that operate according to a defined protocol or air interface. The air interface defines channel format, timing, modulation, and other aspect for radio communication. The RFID tag device 104 includes a first RF interface 107 to communicate with the toll service subscriber 102 via radio link 108, and a second RF interface 105 to communicate with another device, such as an RFID reader 110, over radio link 112. The radio links 108, 112 indicate communication between the devices over their respective RF interfaces. The RFID tag device 104 can be held against, or substantially close to the toll service subscriber 102, such as by forming the RFID tag device 104 in the form of a card with an adhesive layer to affix the RFID tag device 104 onto a surface (such as a back surface) of the toll service subscriber 102 as indicated by arrows 106. In some embodiments the toll service subscriber 102 and RFID tag device 104 communicate via radio link 108 using a near field communication (NFC) protocol, such as that specified by the International Organization for Standardization (ISO) or International Electrotechnical Commission standard (IEC) 18000-3 which has an effective range of about 10 cm and operates at 13.56 MHz. Typically the NFC communication between the toll service subscriber 102 and the RFID rag device 104 will be encrypted for security purposes. In addition to exchanging data over the radio link 108, the toll service subscriber 102 can power the RFID tag device 104 via radio link 108. The energy of the NFC signal from the toll service subscriber can be collected in the RFID tag device and used to by the RFID tag device 104 to respond to the toll service subscriber over link 108, as well as for RFID operations via radio link 112. Radio link 112 between the RFID tag device and RFID reader 110 can be a RFID interface, such as, for example, that specified by ISO/IEC 18000-6C, ISO/IEC 18000-6B, the Interagency Group (IAG) Time Division Multiplexing (TDM) standard, or other known RFID interface standards. In some embodiments, the link 112 can be specifically configured to operate according to a vehicular toll standard for use in wireless tollway systems. In such embodiments, the RFID reader 110 can be a tollway reader that is positioned over a traffic lane of a toll road. The RFID reader 110 includes an antenna and transceiver to support communications with RFID tag devices, as is known. As the RFID tag device 104 passes by the reader 110, a signal from the reader 110 causes the RFID tag device 104 to respond via link 112 with identification information to identify the RFID tag device 104. Furthermore, the reader 110 can, in some embodiments, transmit transaction information to the RFID tag device 104 via link 112. The transaction information can include information such as an identification of the reader 110, location, a toll amount, the time, and so on. In some embodiments the reader 110 does not transmit transaction information to the RFID tag device 104, and the RFID tag device 104 only indicates to the toll service subscriber 102 that it has been read (i.e. that it has responded to a reader signal).

The toll service subscriber 102 contains and executes a toll service application 118 that allows the toll service subscriber 102 to facilitate toll transactions, including processing transaction information received from the RFID tag device 104 or transaction information generated by the toll service subscriber 102 upon receipt of an indication of a transaction by the RFID tag device 104, and forwarding the transaction information to an account server 122. The toll service application 118 also enables toll sharing, allowing the toll service subscriber to share toll payments with other toll service subscribers travelling in the same vehicle 101, such as toll service subscriber 103. By sharing tolls it is meant that each toll service subscriber 102, 103, is responsible for a portion of the toll, where the sum total of the respective toll portions paid by each toll service subscriber unit 102, 103 is equal to the toll amount.

In some embodiments the toll service subscriber 102 initializes the RFID tag device 104 via link 108 before the RFID tag device 104 interacts with the RFID reader 110 via link 112. For example, in a vehicular toll embodiment, the toll service subscriber 102 can determine that the toll service subscriber 102 is approaching a known toll gateway location using location information and road map data that indicates the location of toll gateways. When the toll service subscriber 102, is within a selected distance of a toll gateway, the toll service subscriber 102 can energize NFC link 108 to power up the RFID tag device 104. As the toll service subscriber 102 and RFID tag device 104 pass through the toll gateway, the toll transaction occurs over link 112, and the RFID tag device 104 transmits transaction information to the toll service subscriber 102 via link 108. Any transaction information received at the toll service subscriber 102 from the RFID tag device 104 can be processed by the toll service application 118, which can store the transaction information as well as display the transaction information upon receipt of the transaction information, or at a later time upon user request. Once the RFID tag device 104 completes transmitting to the toll service subscriber 102 subsequent to the transaction, the toll service subscriber 102 can shut off the NFC link 108 to conserve battery life of the toll service subscriber 102.

In some embodiments the toll service subscriber 102, in addition to the radio interface to support radio link 108, comprises another radio interface to communicate at farther distances, such as a cellular transceiver for communicating over a cellular radio telephony link 116 with a cellular telephony infrastructure network 114. The cellular radio telephony link 116 is operated in accordance with a cellular data communications standard, such as, for example, the Long Term Evolution (LTE) standard, the Global System for Mobile Communications (GSM) Enhanced Data rates for GSM Evolution (EDGE), or code division multiple access (CDMA), among other known standards. The toll service subscriber 102 can transmit transaction information over the cellular telephony radio link 116, through a wide area network 120, such as the Internet, to toll service 119 that includes one or more backend servers 121 and one or more account servers 122. The backend servers 121 provide toll services as described herein, and the account servers maintain account information for an account 123 associated with each toll service subscriber 102, 103. The account servers 122 can be linked to one or more banks 124 to maintain funding for transactions applied to the account 123.

The toll service 119 can communicate with a back office server 128 of a toll agency that is associated with reader 110 over similar, if not the same, networks 126, 130. The back office server 128 logs transaction information and reconciles payment of funds due with the toll service 119. Processing the transaction information is typically performed by batch processing, although in some embodiments it is contemplated that processing can be performed on a per-transaction or per-occurrence basis. The toll service 119 can verify transactions based on transaction information received from the toll service subscriber 102 using RFID device 104. The toll service subscribers 102, 103, in some embodiments, can further include other radio interfaces such as, for example, a wireless local area network (WLAN) interface, such as that described in the Institute of Electrical and Electronic Engineers (IEEE) standard 802.11 (a, b, g, n, etc.), and often referred to as "WiFi." In some embodiments the toll service subscriber 102 can use the near field communication interface 108 to communicate with another device besides the RFID tag device 104, which can include a networked device that can forward transaction information from the toll service subscriber 102 to the toll service 119 so that payment can be reconciled with the toll agency back office server 128 and debited to the account 123 in proportion to the respective toll service subscriber's portion of the shared toll.

It is contemplated that, in addition to sharing tolls, the toll service subscribers 102, 103 can provide the toll service 119 with occupant count information indicating the number occupants in the vehicle 101 (some occupants may not have toll service subscribers). In toll systems where a discount is given on the toll amount for vehicles with more than one occupant, the toll service 119 can inform the toll agency, via back office service 128, for example, of the occupant count presently associated with the identifier used by RFID tag device 104. In some embodiments the toll agency can maintain an account service 129 that is substantially similar to account server 122, or instead of the toll service maintaining account server 122. A toll agency-maintained account server 129 can manage accounts 131 for subscribers. Alternatively, the toll service 119 can assert a discount upon settling toll transactions with the toll agency. To prevent false occupant counts (e.g. relying solely on the user of the toll service subscriber 102), the toll service 119 can make determinations to reduce the likelihood of false occupant counts being used to obtain undeserved toll discounts.

For example, the toll service application 118 can report location information to the toll service 119, which can then determine toll service subscribers 102, 103 which appear to be co-located and moving together. In some embodiments the toll service application 118 can detect that it is in a vehicle, such as by monitoring its own location and determining that it is moving at a speed and along a roadway (using a map service, for example) indicative of vehicular travel, or by detecting the toll service subscriber 102 or 103 establishing a wireless personal area network (PAN) link with the vehicle (e.g using BlueTooth). To further discourage false occupant count information being provided to the toll service 119, a law enforcement application programming interface (API) can be provided by the toll service 119 to allow law enforcement 125 to determine how many occupants have been reported for a given vehicle.

Figure 2:
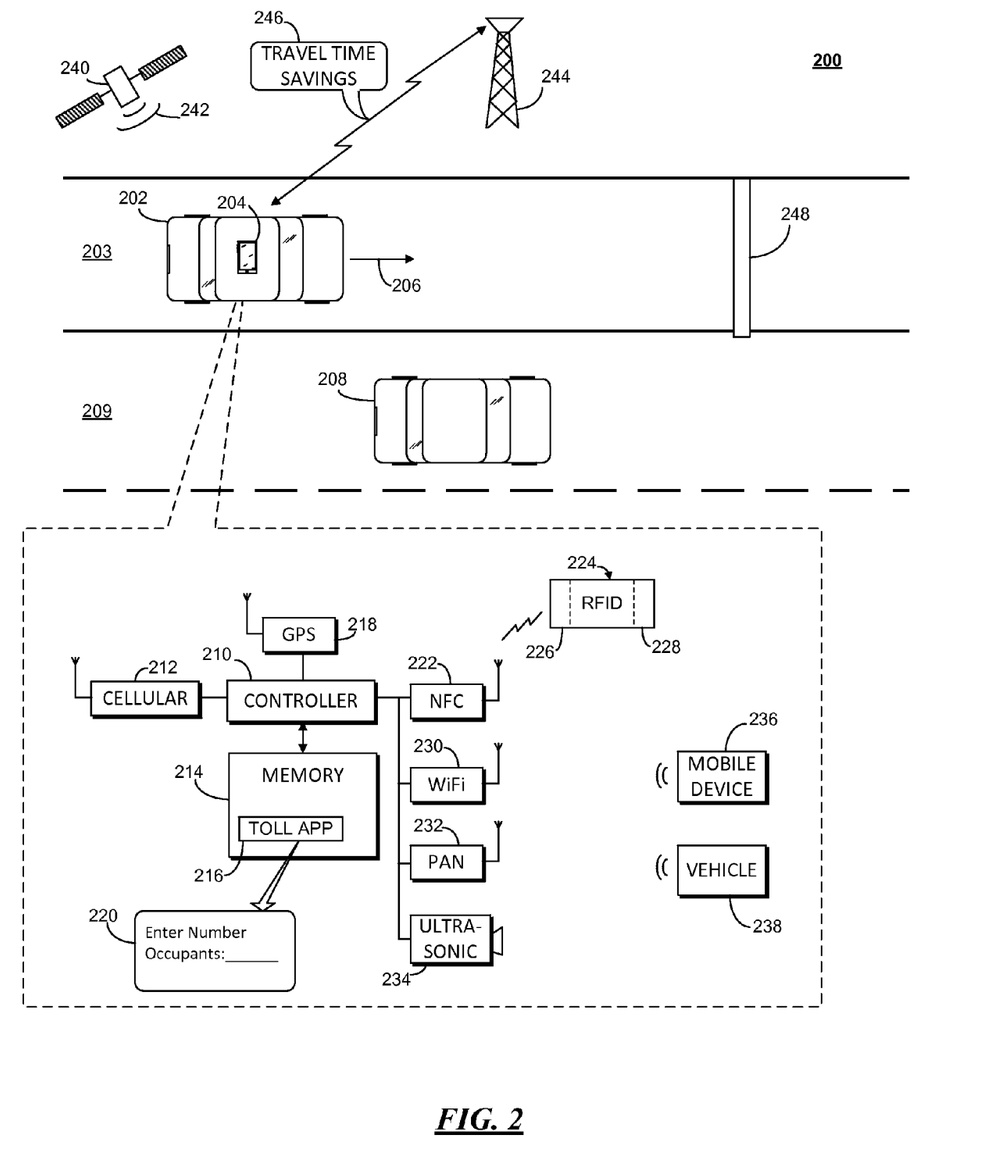
FIG. 2 is a toll system diagram showing a mobile device that enables wireless payment of tolls in accordance with some embodiments.

FIG. 2 is a toll system diagram 200 showing a mobile device that enables wireless payment of tolls in accordance with some embodiments. A first vehicle 202 travels in a toll lane 203 and carries one or more toll service subscribers 204. Vehicles travel in the direction of arrow 206. A second vehicle 208 travels in a non-toll lane 209. The toll lane 203 and non-toll lane 209 can be separated by a barrier, as is known, to prevent vehicles in the toll lane from switching into the non-toll lane before passing through a toll station 248, and likewise to prevent vehicles in the non-toll lane from changing into the toll lane once past the toll station 248. The driver of the first vehicle 202 can decide to drive in the toll lane 203 to avoid traffic congestion in the non-toll lane 209. It will be appreciated that, although only one toll lane 203 and non-toll lane 209 are illustrated here that there can be additional lanes of both types of lanes 203, 209.

The toll service subscriber 204 can include several components and subsystems, such as a controller 210 that is coupled to a global positioning system (GPS) receiver 218, a cellular telephony radio transceiver 212, and NFC transceiver 222, and memory 214. An toll service application 216 can be stored in the memory that is executed by the controller 210. The memory 214 can represent an aggregation of different types of memory, including ROM memory, RAM memory, bulk storage memory, flash memory, and so on. The GPS receiver 218 can receive GPS signals 242 transmitted by GPS satellites 240 to determine the location of the GPS receiver 218 as is known. The toll service application 216 can request location information from the GPS receiver 218 to compare the location of the GPS receiver 218 (and hence the location of the toll service subscriber 204). As the toll service subscriber 204 gets within a certain distance of the toll station 248, the toll service application 216 causes the toll service subscriber to turn on the NFC transceiver 222 so that it transmits to an NFC RF interface 226 on the RFID tag device 224, thereby providing power (through the energy collector circuitry) to the RFID tag device 224. When the vehicle 202 then passes under the toll station 248, a toll reader signal is received by an RFID interface 228 of the RFID tag device 224, and the RFID tag device 224 responds to the reader signal by transmitting the RFID information, including a substantially unique identifier, to allow a toll charge to be debited to an account or accounts associated with the identifier. Once the RFID tag device 224 has been read by the toll station 248, an indication of the transaction, including transaction information, can be transmitted from the RFID tag device 224 to the toll service subscriber 204 via the NFC RF interface 226.

The toll service subscriber can further include a wireless local area network (WLAN) interface, often referred to as a WiFi interface 230 that operates according to a known WLAN protocol such as, for example, IEEE standard 802.11 a, b, g, n, etc. The toll service subscriber 204 can further include a personal area network (PAN) interface 232, such as, for example, a BlueTooth interface. Additionally, or alternatively, the toll service subscriber 204 can include an ultrasonic interface 234 for communicating using ultrasonic acoustic signals. The toll service application 216 can utilize the various interfaces 222, 230, 232, 234 to communicate with other nearby (e.g. in the same vehicle) toll service subscribers 236. Additionally, or alternatively, the toll service application can query the vehicle system 238 using the PAN interface 232, for example. The vehicle system 238 can respond to the query with occupant information determined, for example, using seat belt sensors or weight sensors in each seat. The occupant information can be stored at the backend service of the toll service and accessed by law enforcement personnel using, for example, the law enforcement access 125 of FIG. 1. The toll service application 216 can also prompt 220 a user to enter an occupant count in some embodiments. The toll service application 216 can report the occupant count information to the toll service for toll discounts when using high occupancy toll (HOT) lanes (e.g. lane 203). Additionally, the toll service application 216 can receive information from the toll service. The information can be received over a cellular network 244 and can include, for example, expected travel time savings 246 for using a toll lane compared to a non-toll lane for a section of road that the vehicle 202 is approaching, and the toll service application 216 can display or announce the received travel time savings 246 to the user of the toll service subscriber 204.

Figure 3:
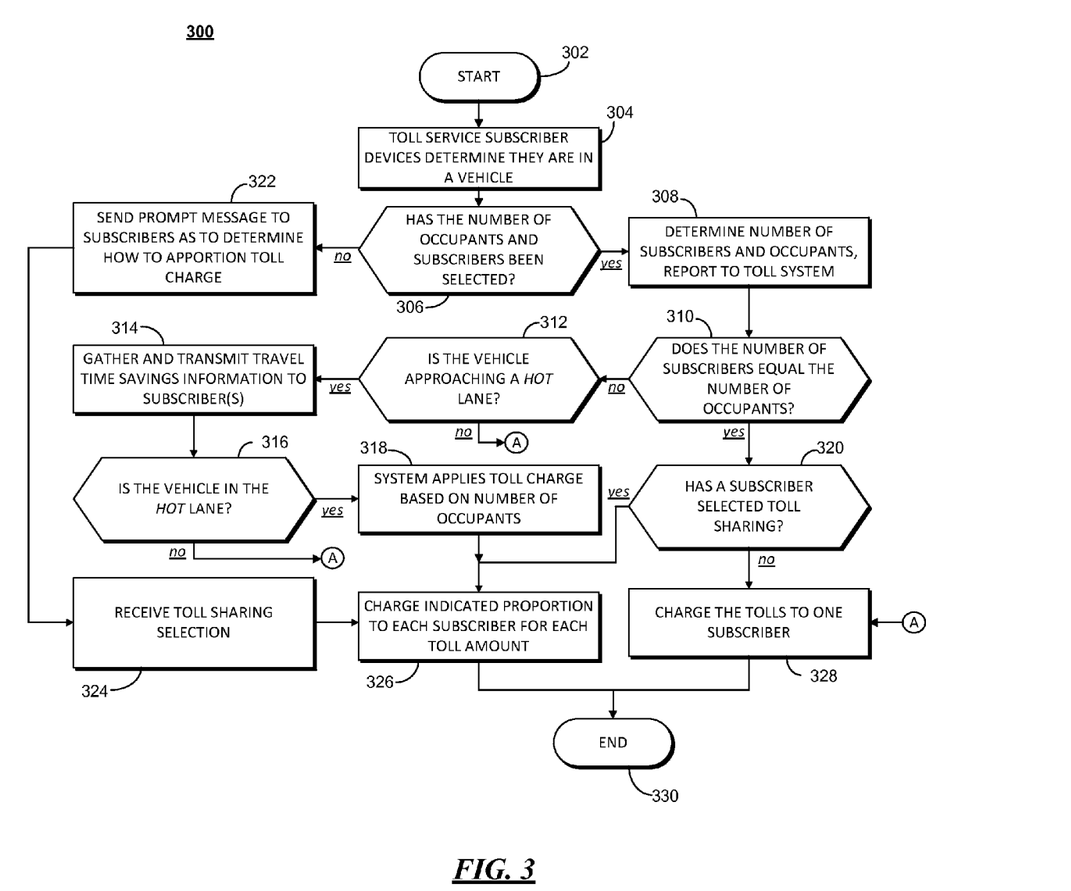
FIG. 3 is a flow chart diagram of a method for sharing toll charges in accordance with some embodiments.

FIG. 3 is a flow chart diagram of a method 300 for sharing toll charges in accordance with some embodiments. At the start 302 one or more toll service subscribers are powered on and located in a vehicle. Accordingly, the toll service subscribers can detect or determine that they are located in a vehicle in process 304, by, for example, determining movement indicative of vehicular travel, determining that the movement is along a roadway using GPS information and a mapping application, or by establishing a radio link to a vehicle system, or by receiving a message from the toll service indicating that the toll service subscriber appears to be moving in a vehicle. The method 300 can then determine, in process 306, whether any toll service subscribers have selected or provided a subscriber and/or occupant count of the occupants in the vehicle to the toll service system. If an occupant count has been provided the method proceeds to process 308 to determine the number of occupant. That is, a toll service application can attempt to verify the occupant count, such as by querying other toll service subscribers in the vehicle, and/or the vehicle system to determine the number of seats that are occupied in the vehicle. The method then proceeds to process 310 where the method determines whether the number of occupants provided matches the number detected. If yes, then the method proceeds to process 320 where the method determines whether a subscriber has selected or authorized toll sharing. If so, then the method proceeds to process 326 where the method charges toll amounts to each participating subscriber in accordance with a prescribed proportion. The default proportion can be each subscriber pays an equal share of the toll, but in some cases several of the occupants may be paid for out of the same account, thus increasing the proportion of toll paid by the corresponding account, such as when, for example, both spouses car pool with other subscribers. The proportions can be user selectable in some embodiments. Returning to process 320, if toll sharing has not been selected, then the method proceeds to process 328 where the method charges the toll to one subscriber.

Returning to process 310, the method can alternatively proceed from process 310 to process 312 where the method determines whether the vehicle is approaching a HOT lane. If not, the method can proceed to process 328 and charge a single subscribe for non-HOT lane tolls. Alternatively, even non-HOT lane tolls can be shared by the subscribers in the vehicle using substantially the same processes. Returning to process 312, if the vehicle is approaching a HOT lane, the method proceeds to process 314 where the toll service system gathers travel time information for the HOT and non-HOT lanes and transmits an estimated travel time savings to the subscriber so that the subscriber can determine whether to enter the HOT lane or not. In process 316 the method 300 determines whether the vehicle has entered the HOT lane. If so, the method 300 proceeds to process 318 and can provide a discount based on the number of occupants, and then proceed to process 326, described previously. Returning to process 316, if the vehicle is not in a HOT lane, the method can proceed to process 328. It is contemplated that some tollways can charge a minimum toll in non-HOT lanes, and allow users who car pool to receive a discount in HOT lanes.

Returning to process 306, if no subscriber has selected a number of occupants, the method 300 proceeds to process 322 where the method can prompt one or more subscribers to provide an occupant count of the number of occupants in the vehicle. Additionally, a proportion can be provided as to how to apportion the toll charges to each subscriber in the vehicle that is participating in the toll sharing. The method 300 can then proceed to process 324, where the method 300 can receive the toll sharing selection at the toll service system, which notes the selected sharing. Any discounts for using HOT lanes can also be applied. The method 300 then proceeds to process 326 to charge the subscribers according to the selected sharing. Finally, once the payment arrangement is decided, the method ends 330.

Figure 4:
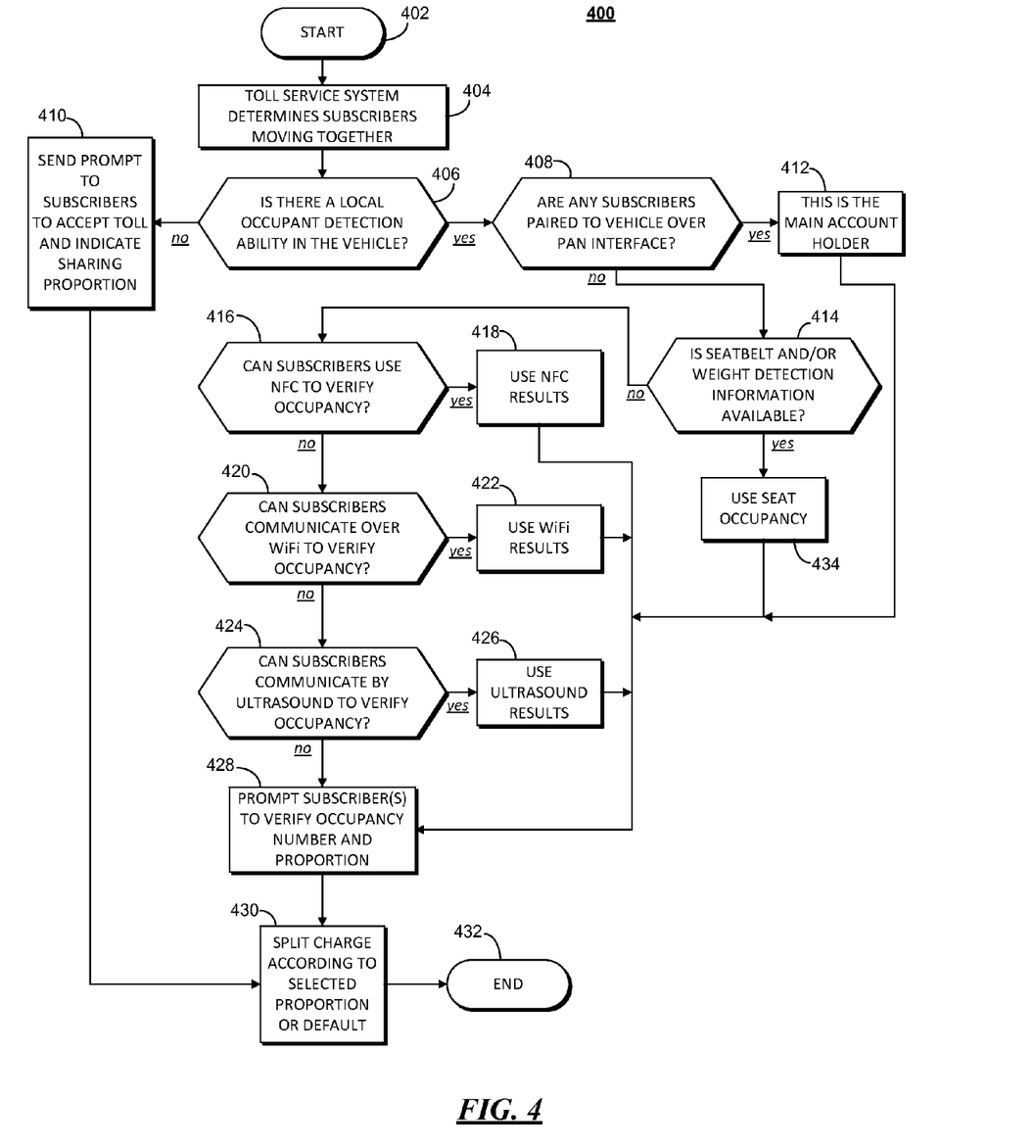
FIG. 4 is a flow chart diagram of a method for detecting a number of subscribers to share toll charges in accordance with some embodiments.

FIG. 4 is a flow chart diagram of a method 400 for detecting a number of subscribers to share toll charges in accordance with some embodiments. The method 400 can commence from the start 402 by determining that several toll service subscribers are moving together in process 404. The determination can be made by the toll service subscribers reporting to the toll service system that they are moving. The method 400 can then proceed to process 406 where the method determines if there is an ability for the toll service subscribers to detect occupants in the vehicle (the number of occupants can be different than the number of subscribers). If not, the method proceeds to process 410 where the method 400 sends a prompt from the toll service system to each subscriber in the vehicle to accept toll sharing, and they can indicate a sharing proportion. The method 400 then proceeds to process 430 where the method 400 splits toll charges among the subscribers according the selected proportion, or equally as a default. Returning to process 406, if there are occupant detection means available (e.g. querying the vehicle system, ultrasonic communication, local low power radio interface, and so on) the method 400 can proceed to process 408 to determine if there is any toll service subscriber paired with the vehicle system (e.g. using BlueTooth™). If so, then it can be assumed, in some embodiments, that the paired toll service subscriber is the main account holder (412) and that the paired toll service subscriber will be associated with an RFID tag device used to perform wireless toll transactions and the method 400 proceeds to process 428. If, in process 408, there are no subscribers paired to the vehicle system, the method 400 can proceed to process 414 in an attempt to receive occupant count information from the vehicle (e.g. seat belt, seat weight sensors). If the vehicle system can provide the information, then the method 400 proceeds to process 434 and the seat information is used as the occupant count. The method can optionally allow a user or subscriber to verify the occupant count and toll sharing proportions in process 428. The method 400 then proceeds to process 430, where the toll charges are split accordingly.

Returning to process 414, if the vehicle system cannot provide seat sensor information, the method 400 can proceed to processed 416, 420, and 424, which are each different means for attempting to determine the number of subscribers in the vehicle. In process 416 the method 400 attempts to use a NFC interface to detect other subscribers in the vehicle. In process 420 the method 400 attempts to use a WiFi interface to detect other subscribers in the vehicle. In process 424 the method 400 attempts to use ultrasonic communication interface to detect other subscribers in the vehicle. Processes 416, 420, 424 can be used alternately, or in combination. If any of the processed 416, 420, 424 can be used, they each can provide a count of other subscribers in corresponding processes 418, 422, 426. Once a count of subscriber/occupants is obtained the method 400 can optionally allow the count to be verified or edited/adjusted in process 428. The method 400 then proceeds to divide toll charges accordingly in process 430, whereupon the method 400 ends at process 432.

Figure 5:
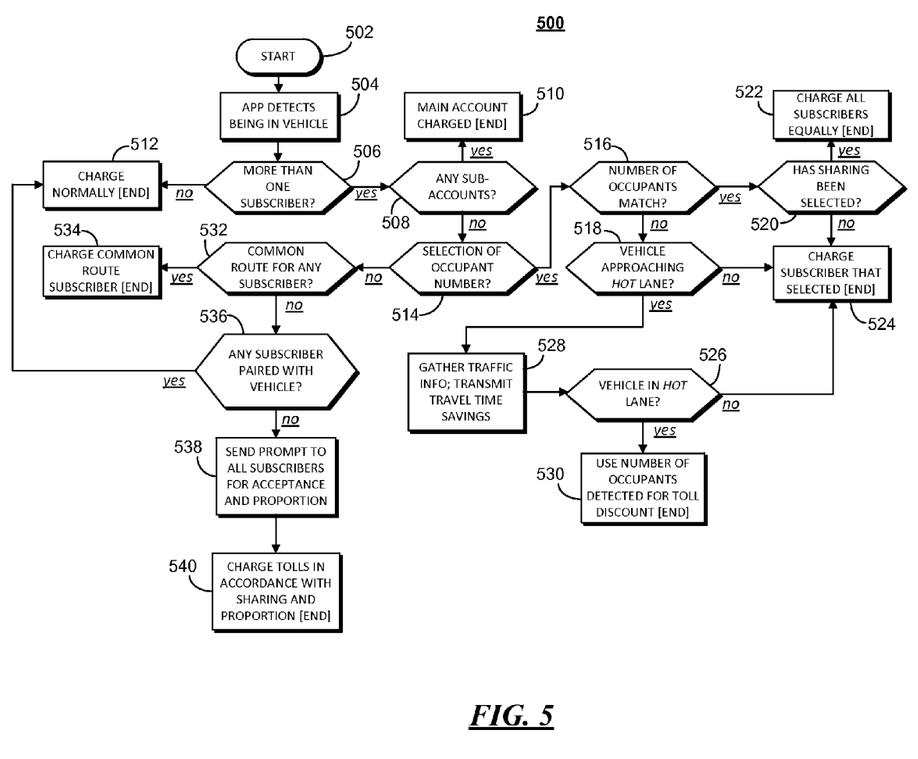
FIG. 5 is a flow chart diagram of a method for sharing tolls in accordance with some embodiments.

FIG. 5 is a flow chart diagram of a method 500 for sharing tolls in accordance with some embodiments. From the start 502 the method 500 proceeds to determine that the toll service subscriber is located in a vehicle, which can be performed by the toll service application. The method 500 then determines if there is more than one toll service subscriber in the vehicle in process 506. If not, then the method merely apportions the entire toll amount for toll charges to the one toll service subscriber. If there is more than one toll service subscriber detected in process 506, the method 500 can proceed to process 508 to determine if the other toll service subscriber(s) are sub-accounts of the same account. If so, then in process 510 the main account is charged for all toll amounts. If not all of the detected toll service subscribers are sub-account holder, the method 500 proceeds to process 514 to determine if there has been a selection of the number of occupants. If not, then in some embodiments the method 500 can proceed to process 532 to determine if the route being followed is a common route for one of the toll service subscribers. A common route is one which is frequently or regularly travelled by a subscriber. If so, then in process 534 the method 500 can charge all toll amounts to the toll service subscriber associated with the route. If several toll service subscribers share the common route, the toll amount can be split among them. If the route is not a common route, the method 500 can proceed to process 536 to determine whether any of the toll service subscribers are paired with the vehicle system. If so, the method can proceed to process 512 and charge the toll normally (e.g. to one subscriber). If there is no toll service subscriber paired with the vehicle system, the toll service system can prompt each toll service subscriber to accept toll sharing, and allow the subscribers to provide toll sharing proportions in process 538. The method 500 can then proceed to process 540 where the method 500 can divide toll amounts accordingly.

Returning to process 514, if the number of occupants is selected or determined, the method 500 can proceed to process 516 to determine if the number of occupants selected matches with a number of occupants determined to be in the vehicle (e.g. by performing method 400). If so, the method 500 proceeds to process 520 to determine if sharing has been selected. If sharing has been selected, then in process 522 the toll service subscribers are charged equally, or in proportion as indicated. If sharing has not been selected in process 520, then one subscriber account is charged for the full toll amount, such as the subscriber who entered the number of occupants.

Returning to process 516, the method 500 can alternatively proceed to process 518 where the method 500 determines whether the vehicle is approaching a HOT lane, or a tollway that has a HOT lane. If not, then the method 500 proceeds to process 524 and one subscriber is charged for tolls (or alternatively tolls are divided among subscribers in the vehicle). If the vehicle is approaching a HOT lane, the toll service system can gather traffic information and determine a travel time savings that can be achieved using the HOT lane instead of the non-HOT lanes. The method 500 can then determine if the vehicle is in the HOT lane in process 526. If so, then the number of occupants can be used to determine a toll discount in process 530. If the vehicle is not in a HOT lane, then the method 500 can default to process 524.

Figure 6:
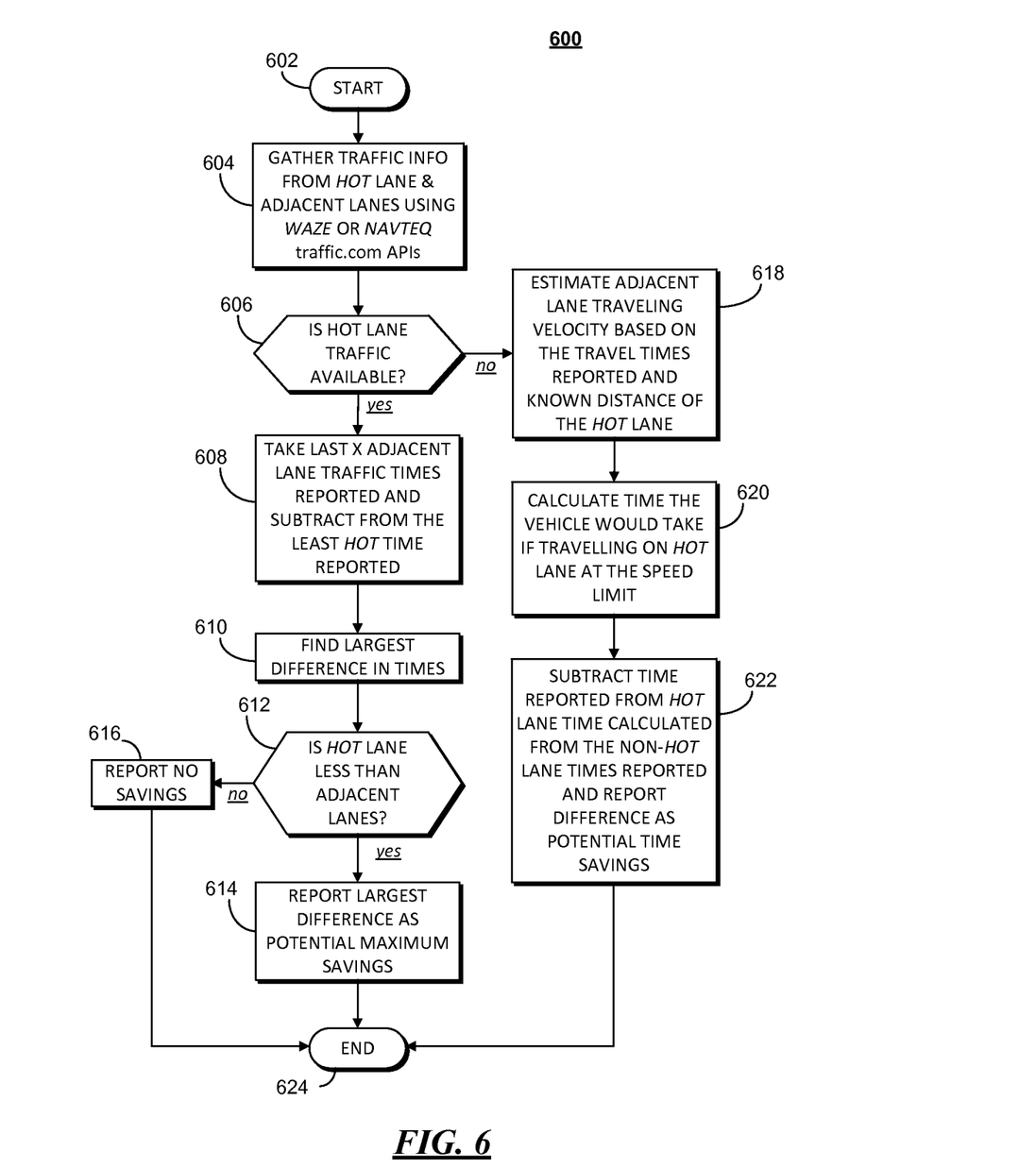
FIG. 6 is a flow chart diagram of a method for providing travel time savings information of a high occupancy toll lane in accordance with some embodiments.

FIG. 6 is a flow chart diagram of a method 600 for providing travel time savings information of a high occupancy toll lane in accordance with some embodiments. At the start 602, it has been determined that the vehicle is approaching a HOT lane, meaning that the vehicle is on a road way that, farther down the roadway from where the vehicle is presently located, a HOT lane begins. Thus, the method 600 provides travel time information for the HOT and non-HOT lanes so the driver can determine which to use. Accordingly, in response to determining that the vehicle is approaching a HOT lane, the toll service system can gather traffic information for the HOT and non-HOT lanes ahead using, for example, data acquired from WAZE, NAVTEQ, or traffic.com APIs in process 604. If there is traffic information for the HOT lane in process 606, the method 600 proceeds to process 608, where the toll service system can use a recent number ("X") of traffic times of the non-HOT lanes (which can be adjacent the HOT lanes) and subtract them from the a recent HOT lane travel time over the same distance. The method 600 can then proceed to process 610 to find the largest difference. In process 612 the method 600 determines if there is a travel time savings. If there is no travel time savings, the method 600 can proceed to process 616 and report that there is no time savings between the HOT and non-HOT lanes. If there is a significant different in travel time, as determined in process 612, then the method 600 can proceed to process 614 where the method 600 reports the largest different in times and the potential maximum travel time saving the driver may expect by using the HOT lane.

Returning to process 606, if there isn't commercial traffic reporting service available, the method 600 proceeds to process 618 where the method estimates velocity for the non-HOT lane based on reported travel times (which can be reported to the toll service system by other toll service subscribers using the non-HOT lane) and the known distance. In process 620 the travel time for the HOT lane can be estimated by assuming vehicles can travel at the speed limit of the HOT lane. In process 622 the method 600 can subtract the reported or detected HOT lane estimated travel time from the travel times reported for the non-HOT lanes, and the difference is reported to the toll service subscribers as the amount of time that can be potentially saved by using the HOT lane. Once the time savings (if any) is provided to the toll service subscriber, the method 600 can then terminate 624.

Figure 7:
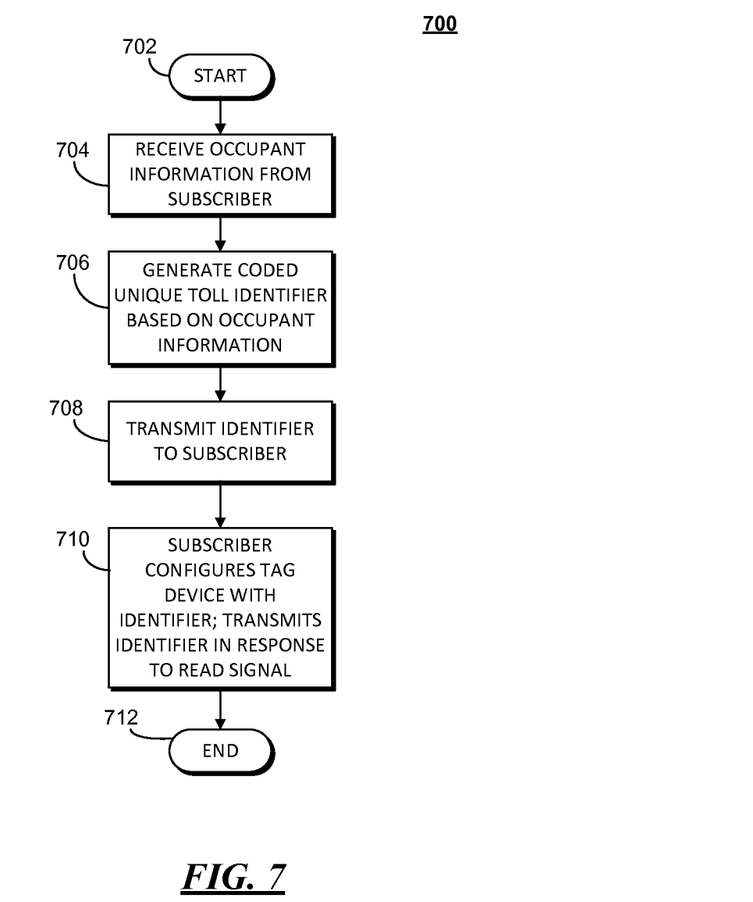
FIG. 7 is a flow chart diagram of a method for generating a unique coded identifier for use in a toll system that provides toll sharing in accordance with some embodiments.

FIG. 7 is a flow chart diagram of a method 700 for generating a unique coded identifier for use in a toll system that provides toll sharing in accordance with some embodiments. In embodiments where a configurable RFID tag device is used, the toll service subscriber can configure the RFID tag device with a unique identifier that can be obtained from the toll service system. At the start 702 a toll service subscriber can determine that an identifier is needed. In process 704 the toll service system can receive a request for an identifier from a toll service subscriber, including a count of the number of occupants in the vehicle. In process 706 the method 700 can generated a coded unique identifier that is then associated with one or more subscriber accounts. The coded unique identifier can include coded information that indicates the number of occupants in the vehicle. In process 708 the toll service system can transmit the coded unique identifier to the toll service subscriber. In process 710 the toll service subscriber can configure an associated RFID tag device with the coded unique identifier, where, upon the RFID tag device receiving a read signal when passing a toll station, the RFID tag device will respond with the coded unique identifier, which is recorded by the toll agency for later toll settlement. The coded unique identifier can be decoded by the toll agency to determine the number of occupants in the vehicle and charge a corresponding discounted toll. Once the RFID tag device is configured, the method 700 can then terminate 712.

The embodiments described herein provide the benefit determining the number of occupants in a vehicle that is using a toll lane, as well as the ability to split the toll amount among the occupants or subscribers in the vehicle. In some embodiments the toll is not split, but rather charged to a single toll service subscriber account, although the toll amount can be discounted based on the number of occupants in the vehicle. This allows roadway authorities who operate a toll agency the ability to reward high occupancy vehicles with toll discounts (including a total exemption), and it allows travelers the ability to reduce the amount of toll they each pay by apportioning the toll amount(s) among several others. In some embodiments the detection of other toll service subscribers and occupants in the vehicle can be automatic, and in some embodiments the detection can involve a manual process where one or more toll service subscriber users enter the number of occupants into their respective toll service subscriber or subscriber device for transmission to the toll service system.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for determining a toll for use of a high occupancy toll (HOT) lane by a vehicle, comprising:
   determining, by a toll service subscriber device of a toll service subscriber in the vehicle, a number of occupants in the vehicle;
   transmitting, by the toll service subscriber device over a cellular radio telephony link, the number of occupants to a toil service to which the toll service subscriber subscribes;
   receiving, over the cellular radio telephony link at the toll service subscriber device, in response to transmitting the number of occupants to the toll service, a unique coded identifier generated by the toll service that indicates the number occupants and that is associated with an account of the to service subscriber of the toll service subscriber device;
   transmitting the unique coded identifier over a near field communication link by the toll service subscriber device to a radio frequency identifier (RFID) tag device associated with the toll service subscriber; and
   the RFID tag device transmitting the unique coded identifier to a tag reader of a toll agency via a RFID interface of the RFID tag device in response to a reader signal being received by the RFD tag device upon the vehicle passing through a toll station;
   wherein the toil agency discounts a toll amount to a discounted toll amount based on the number of occupants of the vehicle as indicated by the unique coded identifier.

2. The method of claim 1, wherein determining the number of occupants in the vehicle comprises the toll service determining that at least two toll service subscribers are located in the vehicle based on location information provided by the toll service subscribers to the toll service.

3. The method of claim 1, wherein determining the number of occupants in the vehicle comprises prompting, by the toll service subscriber device, the toll service subscriber to enter the number of occupants in the vehicle.

4. The method of claim 1, wherein the toll service prompts the toll service subscriber device to attempt to detect an additional toll service subscriber device in the vehicle.

5. The method of claim 4, wherein the one toll service subscriber device attempts to detect the additional toll service subscriber device by performing at least one of: using a near field communication protocol to communicate with the at least one other toll service subscriber device, using a wireless local area network to communicate with the at least one other toll service subscriber device, using an ultrasonic communication protocol to communicate with the at least one other toll service subscriber device, or receiving a message from the toll service system indicating the presence of the at least one other toll service subscriber device.

6. The method of claim 1, further comprising apportioning the discounted toll amount among a plurality of toll service subscribers in the vehicle.

7. The method of claim 1, further comprising determining that a route followed by the vehicle is a common route for the toll service subscriber, and charging the discounted toll amount to the one toll service subscriber for which the route is a common route.

8. The method of claim 1, further comprising:
   the subscriber device providing power to the RFID tag device via the near field communication link while the RFID tag device transmits the unique coded identifier to the tag reader.

* * * * *